Oct. 22, 1940.   J. W. STEWART   2,218,688
SHIP CONSTRUCTION
Filed April 21, 1938   6 Sheets-Sheet 1
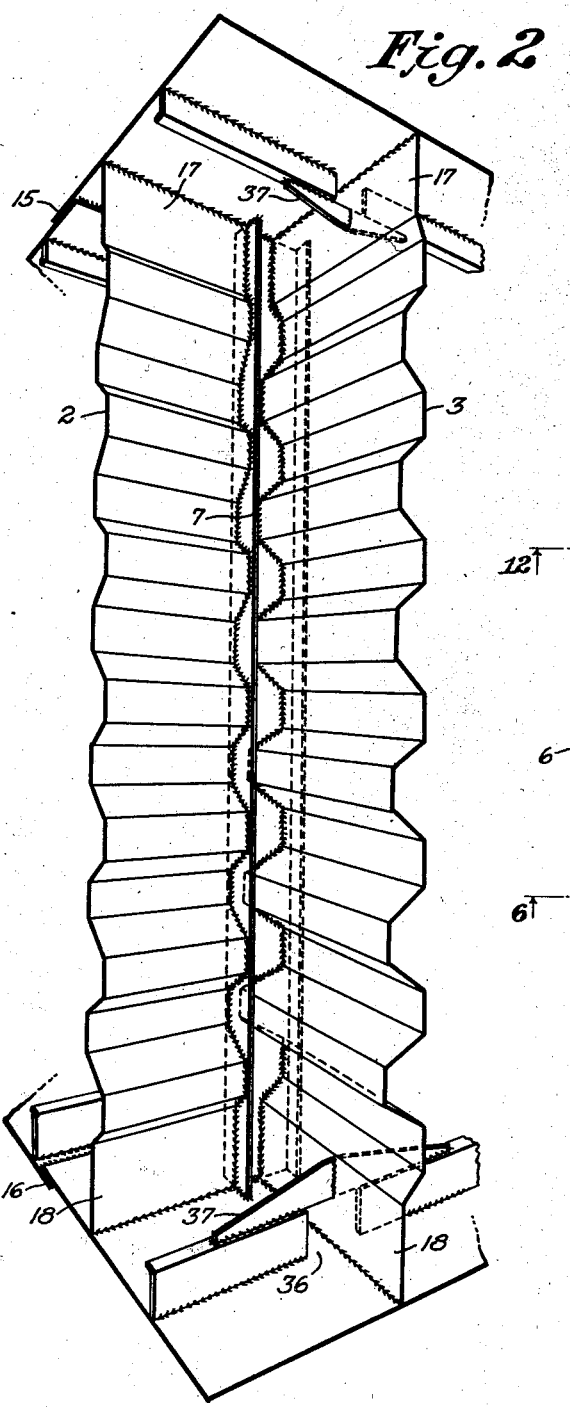
Fig. 2
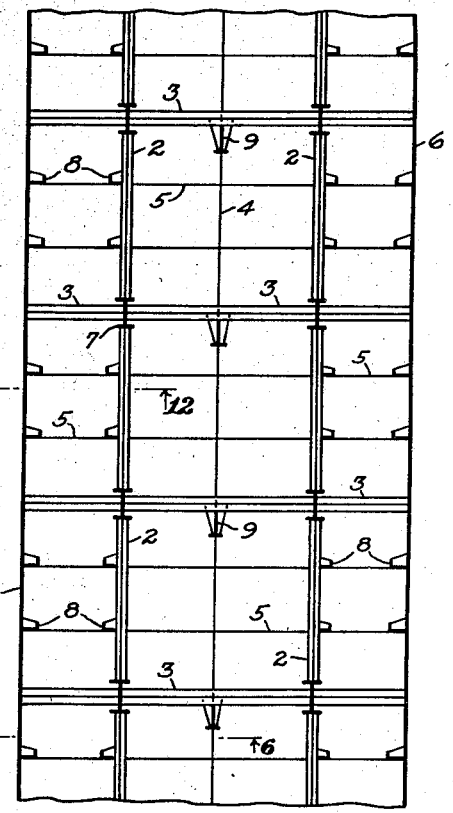
Fig. 1
J. W. Stewart
Inventor
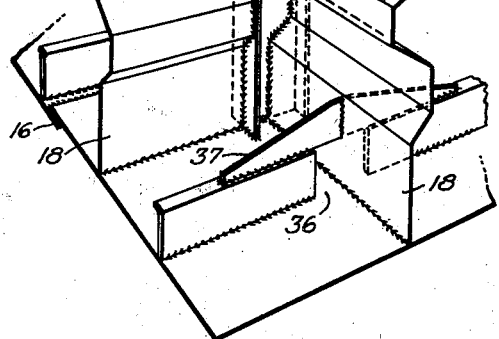
Attorney Oct. 22, 1940.   J. W. STEWART   2,218,688
SHIP CONSTRUCTION
Filed April 21, 1938   6 Sheets-Sheet 2

J. W. Stewart
Inventor
by
Attorney

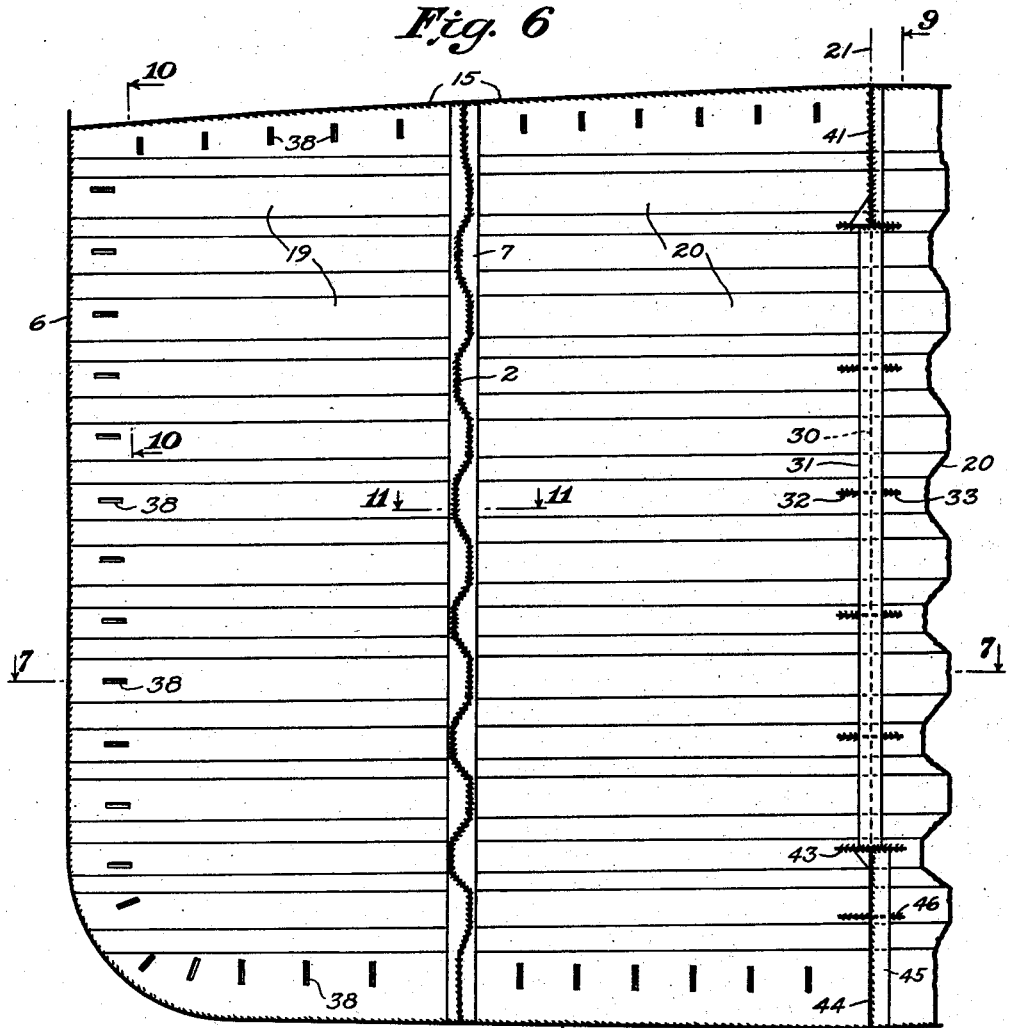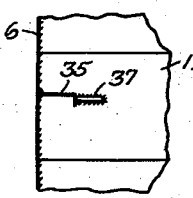

Oct. 22, 1940.  J. W. STEWART  2,218,688
SHIP CONSTRUCTION
Filed April 21, 1938   6 Sheets-Sheet 4

J. W. Stewart
Inventor
by
Attorney

Oct. 22, 1940.  J. W. STEWART  2,218,688
SHIP CONSTRUCTION
Filed April 21, 1938  6 Sheets-Sheet 5
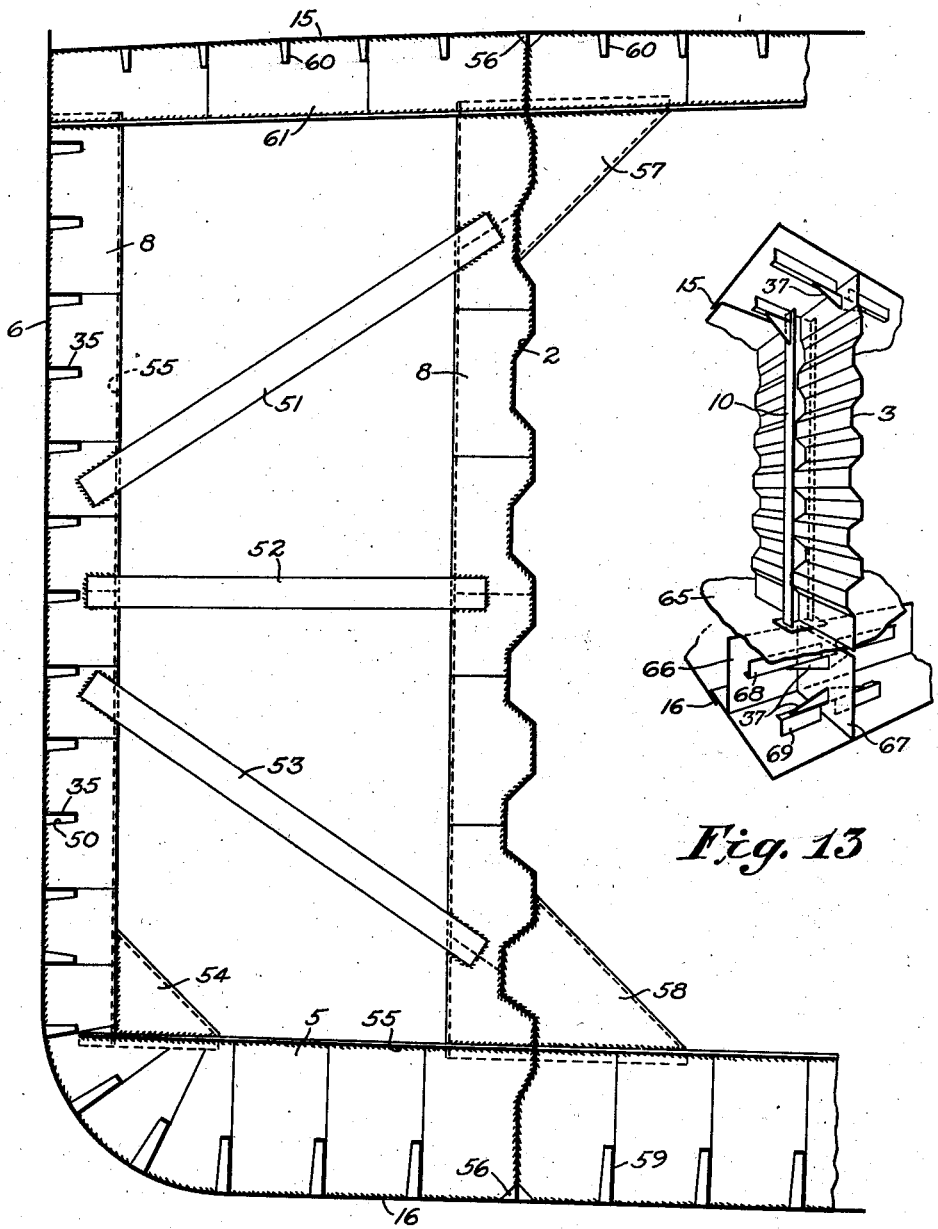
Fig. 12
Fig. 13
J. W. Stewart
Inventor
by 
Attorney

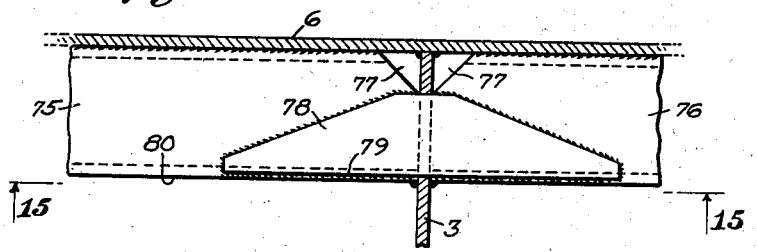
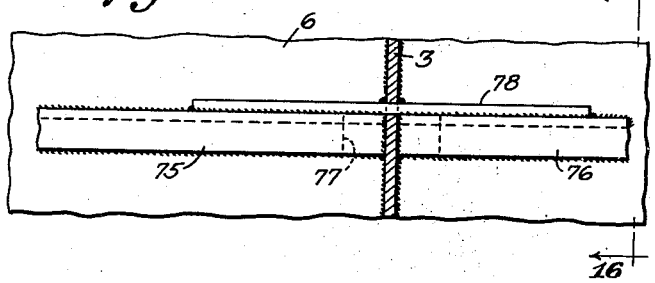
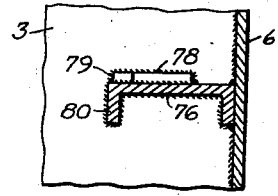
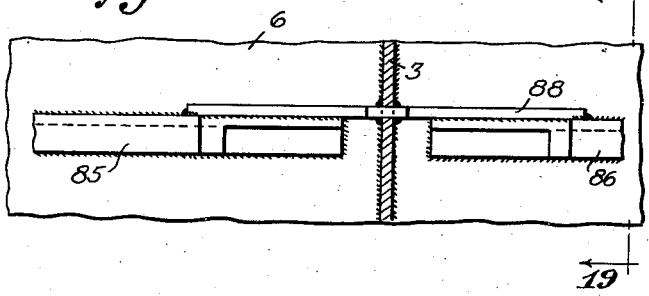
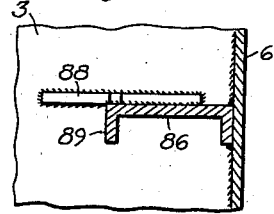
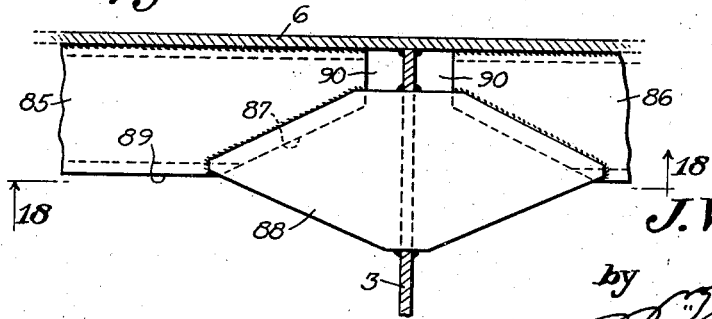

Patented Oct. 22, 1940

2,218,688

UNITED STATES PATENT OFFICE 2,218,688

SHIP CONSTRUCTION

John W. Stewart, New York, N. Y.

Application April 21, 1938, Serial No. 203,394

14 Claims. (Cl. 114—80)

This invention relates to ship construction and more particularly construction of cargo carrying vessels, the invention having for its object to provide a construction which is less costly and more efficient than those heretofore proposed.

With these and other objects in view the invention resides in the novel details of construction and combinations of parts as will be disclosed more fully hereinafter and particularly pointed out in the claims.

Referring to the accompanying drawings forming a part of this specification and in which like numerals designate like parts in all the views—

Fig. 1 is a diagrammatic representation of the plan of a vessel embodying the novel transverse and longitudinal bulkheads constituting a part of this invention;

Fig. 2 is a fragmentary perspective view illustrating the connection between a longitudinal bulkhead and a transverse bulkhead;

Fig. 6 is a transverse sectional view of one half of a vessel in which is incorporated the novel arrangements of transverse and longitudinal bulkheads and taken as on the line 6—6 of Fig. 1 looking in the direction of the arrows;

Fig. 7 is a horizontal sectional view taken as on the line 7—7 of Fig. 6 and looking in the direction of the arrows;

Fig. 8 is a vertical sectional view taken as on the line 8—8 of Fig. 7 and looking in the direction of the arrows;

Fig. 12 is a vertical sectional view taken as on the line 12—12 of Fig. 1 and looking in the direction of the arrows;

Fig. 13 is a fragmentary perspective view somewhat similar to Fig. 2 but illustrating a modification of the bulkhead construction shown therein;

Fig. 14 is a horizontal sectional view illustrating the continuity of the longitudinals in the way of a transverse bulkhead;

Fig. 15 is a vertical sectional view taken as on the line 15—15 of Fig. 14 and looking in the direction of the arrows;

Fig. 16 is a vertical sectional view taken as on the line 16—16 of Fig. 15 and looking in the direction of the arrows;

Fig. 17 is a horizontal sectional view similar to Fig. 14 but showing a modification of the construction illustrated therein;

Fig. 18 is a vertical sectional view taken as on the line 18—18 of Fig. 17 and looking in the direction of the arrows; and Fig. 19 is a vertical sectional view taken as on the line 19—19 of Fig. 18 and looking in the direction of the arrows.

Figure 3:
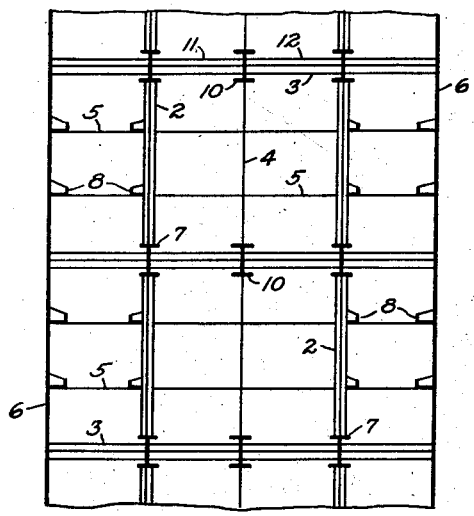
Figs. 3, 4 and 5 are diagrammatic representations of the plans of vessels embodying modifications of the arrangements of the novel transverse and longitudinal bulkheads illustrated in Fig. 1.

This invention primarily has to do with the subdivision of the hold of a vessel by transverse and longitudinal bulkheads into the usual tanks in the case of a liquid cargo carrying vessel, or into storage spaces when cargo other than liquid is to be carried, the novelty of the invention not only residing in the construction of the individual bulkheads, but in the construction employed in the region of the intersection of a transverse bulkhead with a longitudinal bulkhead. Therefore this invention is applicable to vessels of various beams as well as lengths and depths below decks. Another feature of the invention resides in the connections between transverse bulkheads and the longitudinal framing members of the vessel as well as the connection with stiffeners located at spaced intervals for reinforcing purposes. Further, the entire ship may be welded, or partly welded and partly secured as by well known practices such as riveting.

In Figs. 1, 3, 4 and 5 the longitudinal bulkheads have been generally identified by the numeral 2, the transverse bulkheads by the numeral 3, longitudinal girders by the numeral 4 and the usual transverses by the numeral 5, the skin of the vessel being indicated at 6. The transverses may be spaced equally or unequally to suit the desired design of the framing in accordance with the known art. According to Figs. 1 and 3 there is provided a plurality of longitudinal bulkheads disposed on opposite sides of the center line of the vessel whereas, in Figs. 4 and 5 there is a single longitudinal bulkhead disposed in the plane of the center line of the vessel. Where the longitudinal and transverse bulkheads intersect there is provided a vertical pillar generally identified by the numeral 7 and, as shown in these figures comprising an I-beam the flanges of which receive the ends of the longitudinal bulkheads, and the webs of which receive the ends of the transverse bulkheads. In other words, a longitudinal bulkhead is fitted between and secured to the facing flanges of two adjacent pillars, and a transverse bulkhead is fitted between and secured to the facing webs of two adjacent pillars, the ends of the bulkheads being welded to the flanges and the webs respectively. If found desirable, however, the transverse bulkhead may be secured to the flanges of the pillar, in which case the longitudinal bulkhead will be secured to the web thereof. Instead of the specific I-beam construction, the pillars may be of other sections prefabricated and/or assembled to provide a relatively strong unitary support for the bulkheads, the important feature of the pillar being the provision of imperforate opposed flat surfaces to which the ends of the bulkheads can be fitted and welded to form a liquid-tight joint. Hence, the pillar beam preferably is one which is formed, as by a rolling process or by fabrication, in one unitary piece of relatively great strength and having a main web portion and flanges extending laterally therefrom either in opposite directions at both ends of the web portion, or in opposite directions at one end of the web and only in one direction at the other end thereof, wherefore such a beam can be called either an I beam or an H beam. In the following description as well as in the claims, therefore, the term I beam is to be considered as indicative of any of such forms, and the term pillar is to be considered as indicative of any structural member of relatively great strength and of the order of an I beam. Vertical framing members are indicated at 8 in the way of the transverses 5, and vertical stiffeners are indicated at 9 placed intermediate the ends of the transverse bulkheads.

The construction shown in Fig. 3 is similar to that illustrated in Fig. 1, substantially the only difference being that pillars such as 10 (similar to the pillars 7) are substituted for the vertical stiffeners 9 shown in Fig. 1. Therefore it is to be understood that the central transverse bulkhead is divided by the pillar 10 into two aligned portions 11 and 12 according to the construction shown in Fig. 3, whereas there is a single continuous central transverse bulkhead having a vertical stiffener 9 on one side thereof according to the construction shown in Fig. 1.

Figure 4:
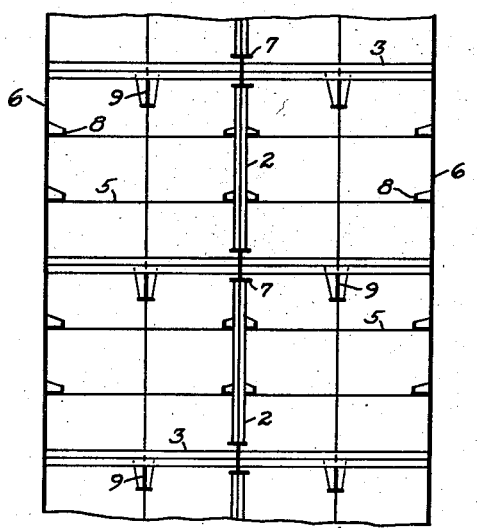
Figure 5:
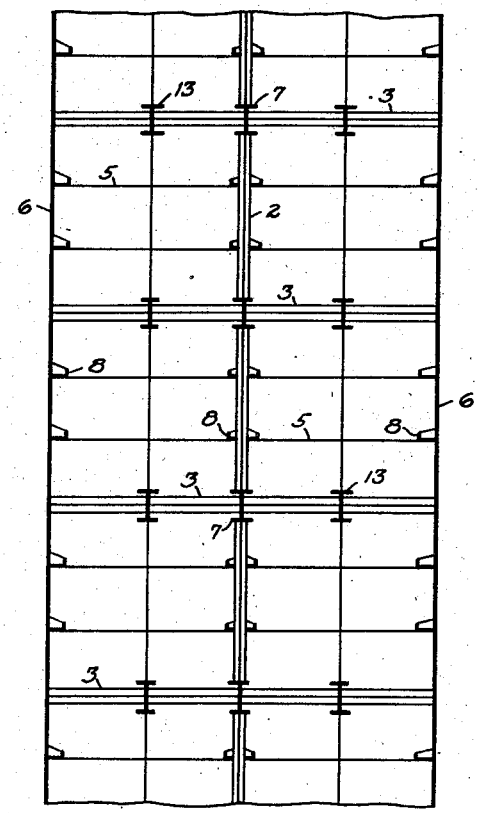

In like manner the constructions of Figs. 4 and 5 are similar except that pillars indicated at 13 have been provided in addition to the centerline pillars 7 in the construction shown in Fig. 5, thereby making all of the transverse bulkheads intercostal with respect to said pillars and the skin of the vessel, whereas in Fig. 4 vertical stiffeners 9 are provided on one side of and substantially midway the ends of each of the transverse bulkheads extending from the pillars 7 to the skin of the vessel.

Fig. 2 particularly illustrates the construction of the bulkheads and their connection with a pillar at the intersection of said bulkheads. The longitudinal bulkhead in this figure is generally identified by the numeral 2 and the transverse bulkhead is indicated by the numeral 3, the deck plating is indicated by the numeral 15 and the bottom plating is shown at 16. The pillar preferably comprises a vertical I-beam welded at its top and bottom respectively to the deck plating and the bottom plating, the web of the pillar being illustrated as lying in a longitudinal plane of the vessel wherefore the flanges lie in transverse planes of the vessel. Each bulkhead comprises a corrugated sheet or wall composed of a plurality of sections not illustrated but readily understood, the sections being provided for ease and economy in manufacturing, the sections suitably assembled preferably by welding to make up the whole of the bulkhead, such sections being of a length to extend from one pillar to another or from a pillar to the ship's plating. The corrugations are disposed horizontally and may be of various transverse cross-section or contours though in the drawings an angular formation is shown since this shape admirably lends itself to ship building practices, the angles being obtuse wherefore ready drainage of liquid cargo is made possible.

The corrugations of the bulkheads preferably are not uniform from top to bottom thereof but progressively vary in width or depth from least (adjacent the deck) to greatest (adjacent the ship's bottom) as clearly illustrated, and the spacings of the corrugations from center to center in the direction from the deck to the bottom may be made equal or not as desired and found necessary. Hence the deepest corrugations being adjacent the bottom of the vessel, there is added strength in the bulkhead where the greatest pressure of a liquid cargo is to be found. The corrugations are continuous throughout the main body portion of the bulkhead but said corrugations stop adjacent the deck and bottom of the vessel, there being provided a planar vertical sheet portion 17 adjacent the deck and a similar sheet portion 18 adjacent the ship's bottom, the portions 17 and 18 lying substantially in the same plane, which plane substantially bisects the corrugations of the main body portion of the bulkhead. It, however, may be found better from a practical and simplified point of view to make the corrugations of a uniform depth; this however would handicap the dead weight of the vessel by an added tonnage of steel up to possibly 40 tons.

The bulkheads preferably are prefabricated so that they may be dropped into place and secured to the pillars and to the ship's skin. This prefabrication is such that the vertical edges or sides of the bulkheads will abut the respective surfaces of the pillars and the ship's skin and be suitably secured to such surfaces as by a continuous weld, resulting in a liquid tight joint. The corrugations at the bottom of the longitudinal bulkheads will have a width or depth nearly but not quite equal to the width of the flange of the pillar to which it is welded to provide space for the welding, and the width or depth of the corrugations at the bottom of the transverse bulkheads will be a little less than the dimension of the web of such pillars, leaving just enough space within which to accomplish the welding of the transverse bulkhead to said web. All of the bulkheads are welded to the deck and to the ship's skin including the bottom plate.

Referring to Figs. 6, 7 and 8 the ship's skin is indicated at 6, 15 is the deck, 16 is the ship's bottom, 7 is a vertical pillar of I-beam construction, 19 is a transverse bulkhead disposed between said pillar and said skin, 20 is a similar transverse bulkhead extending from said pillar to a similar pillar (not illustrated due to lack of space in this figure) disposed on the opposite side of the center line 21 of the vessel, and 2 and 22 are aligned longitudinal bulkheads welded to but separated by the pillar 7. A vertical plate 30 to be described later in more detail is shown disposed on the center line 21 of the vessel and extending to one side of and joined to the transverse bulkhead 20, said plate having its free edge reinforced by a flange 31 and braced, by brackets such as 32 and 33, with respect to said bulkhead. Aligned longitudinal framing members such as 34 and 35 are carried by the deck and the ship's skin, and may terminate short of the transverse bulkheads as shown to provide a space such as 36 between the end of a longitudinal and said bulkhead, the ends of two aligned longitudinals being joined by a splice plate 37 extending continuous through an aperture such as 38 provided therefor in the transverse bulkhead. Obviously, the longitudinals may extend to the bulkhead and be secured thereto either with or without such a space or aperture adjacent said bulkhead. It is to be noted in Fig. 7 that there has been shown in dotted lines an I-beam 10 to indicate the alternate construction hereinbefore described in connection with Fig. 3. Welding is preferably employed for securing each and every element in the ship's construction to the other elements.

Figure 9:
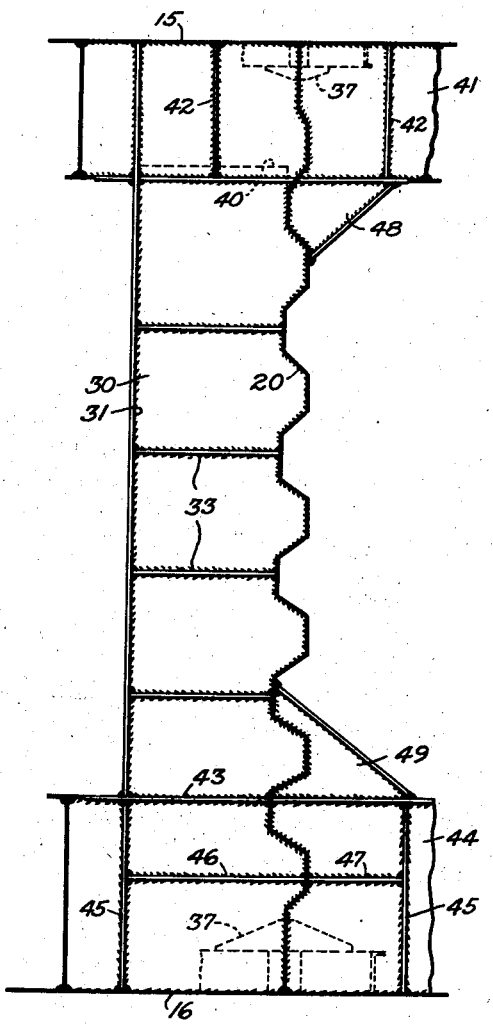
Fig. 9 is a vertical sectional view taken as on the line 9—9 of Fig. 6 and looking in the direction of the arrows.

Referring to Fig. 9 the transverse bulkhead 20 shows to best advantage its corrugated form, said bulkhead extending continuous from the deck 15 to the bottom plating 16 and welded thereto. The vertical stiffener 30 is shown having one edge thereof cut to fit the corrugations of the bulkhead and having its opposite edge provided with the flange, face plate or other structural member 31. Said stiffener or web plate may extend to the deck and to the bottom, but in this figure it is illustrated with its upper edge 40 terminating short of the deck but secured in overlapped relation to a longitudinal deck girder 41 having the transverse stiffener plates 42; and the lower edge of the web 30 preferably terminates on but is secured to the face plate 43 of a longitudinal girder plate 44 having the transverse stiffener plates 45 secured thereto. The web brackets are shown at 33 and similar brackets 46 and 47 are shown bracing the longitudinal girder 44, and angled brackets 48 and 49 are shown respectively adjacent the upper and lower ends of the web 30 but on the opposite side of the bulkhead 20. The corrugated form of bulkheads hereinbefore disclosed are particularly advantageous in that they provide additional inherent strength to the ship's construction, make unnecessary the provision of additional horizontal stiffeners with attendant added weight to the dead weight tonnage of the vessel, and by virtue of the gradation of depth of the corrugations, whereby the corrugations of greatest depth are in the ship's bottom, render greater resistance particularly to the pressures of a liquid cargo.

Figure 10:
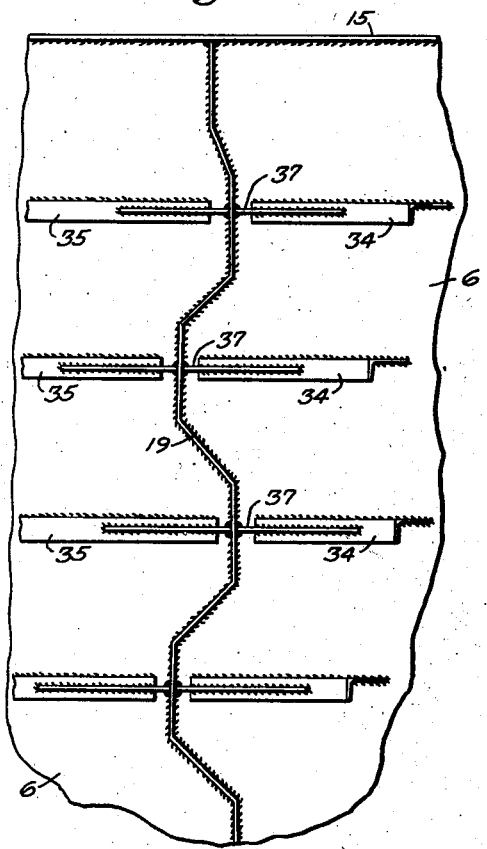
Fig. 10 is an enlarged vertical sectional view taken as on the line 10—10 of Fig. 6 and looking in the direction of the arrows.

In Fig. 10, the longitudinal framing members such as 35 are shown in spaced relation attached to the ship's skin 6, and the transverse bulkhead 20 is shown with said longitudinals stopping short thereof but joined together by the splice plates such as 37, with a continuous weld around the intersection of each splice plate with said bulkhead. By having the longitudinals extend into the corrugations of the bulkhead, it will be observed that the ship's skin is reinforced by adjacent longitudinals; that is to say the alternate longitudinals extend beyond the ends of the intermediate longitudinals and stiffen thereby the ship's skin against stresses in a manner that is not possible as in prior known constructions where all of the longitudinals have their ends in a common transverse plane of the vessel.

Figure 11:
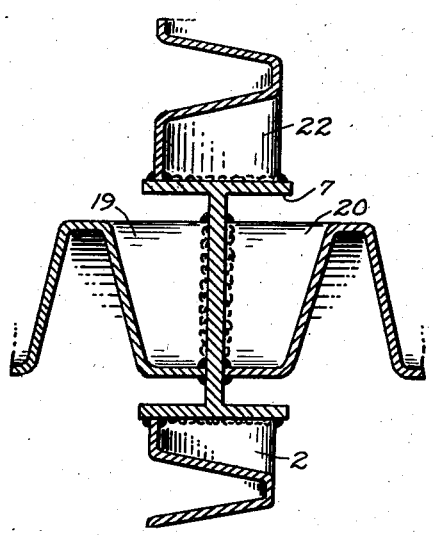
Fig. 11 is an enlarged horizontal sectional view taken as on the line 11—11 of Fig. 6 and looking in the direction of the arrows.

Fig. 11 is an enlarged horizontal section showing the connection between an I-beam pillar 7 and the bulkheads terminating thereagainst, the longitudinal bulkheads 2 and 22 being shown welded to the outer surfaces of the flanges of said pillar, and the transverse bulkheads 19 and 20 having their ends welded to the web of said pillar.

Fig. 12 is a view somewhat similar to Fig. 6 but taken transversely of the vessel intermediate two adjacent transverse bulkheads, the purpose being to illustrate the transverse web framing of a tank. This view is taken on the line 12—12 of Fig. 1 wherefore 5 represents the vertical webs on opposite sides of the tank and having secured thereto by welding the longitudinal framing members 35 extending continuous through said webs which latter are notched as at 50 to receive such longitudinals. The opposite webs are suitably connected by the braces or structural struts indicated at 51, 52 and 53, and at the turn of the bilge there is provided a bracket 54 connecting the web along the ships' side with the bottom transverse web 5. These webs may be reinforced suitably as by flanged edges indicated as at 55. The vertical web secured to the longitudinal bulkhead 2 in a manner similar to that shown in Fig. 9, has its upper and lower ends terminating short of the deck and bottom but in overlapped or butting relation with the top and bottom transverse webs 61 and 5, which latter are provided with the drain and ventilation openings such as 56 at the corners thereof between the longitudinal bulkhead and the deck and/or ship's bottom. For additional strength an angled top bracket 57 and a similar bottom bracket 58 may be provided in the transverse planes of the wing webs but disposed on the opposite side of the longitudinal bulkhead 2. Longitudinal framing members 59 of increased strength may be provided in the ship's bottom, and longitudinals 60 of relatively lesser strength are provided at the deck. When a center-line bulkhead only is fitted (as in Fig. 4) the wing web will be similar to the web 30 shown in Fig. 9 except that it will be carried to the longitudinals at the deck and bottom as in usual practice.

The construction shown in Fig. 13 is somewhat similar to that shown in Fig. 2 the main difference being that there is no longitudinal bulkhead, wherefore this view may represent the construction at an intermediate pillar 10 as shown in Fig. 3 or a similar construction where a longitudinal corrugated bulkhead was not needed. For example, sub-division bulkheads might be desired which would be disposed transversely or longitudinally of the vessel and of such extent as to warrant an intermediate pillar support, in which case the construction of Fig. 13 would be particularly desirable, either for liquid or package freight cargo. Although for package freight the corrugated bulkhead may provide broken stowage yet such would not be any more than that lost due to the stiffening which is usually and necessarily fitted. Also there is shown an inner bottom 65 spaced from the ship's plating 16 by the longitudinal girder 66 and the transverse subdivision wall 67, the pillar 10 extending from the deck to the inner bottom only. The space between the bottoms is provided with upper and lower longitudinal framing members 68 and 69 respectively but which individually may be of lesser strength than the longitudinal framing members 59 shown in Fig. 12, said longitudinals stopping short of the transverse subdivision wall 67 but interconnected by splice plates which latter pass continuous through and are welded to said wall, as shown. On the other hand, the vertical pair of longitudinal members 68 and 69 may be interconnected by a single splice plate instead of the two as shown, which single plate, however, will also pass continuous through and be welded to the subdivision wall.

Whereas in Fig. 2 the I-beam pillar has been shown as extending to the ship's bottom plating, said pillar according to Fig. 13 is stopped at an inner bottom. Further, the construction of Fig. 2 shows both a longitudinal and a transverse bulkhead intersecting or meeting at such a pillar, whereas in Fig. 13 there is shown no longitudinal bulkhead at such a pillar. The omission of a longitudinal bulkhead is desirable in vessels designed for cargoes other than liquid. Therefore it is obvious that vessels may be designed for combined cargoes of bulk and liquid in which case longitudinal bulkheads may be required in only certain portions of the vessel, with no such bulkheads in the remaining portions.

By providing the pillar units heretofore described in combination with the corrugated longitudinal and transverse bulkheads, there is made possible a considerable saving in the steel weight of the vessel. In other words, in a vessel of about 15,000 tons dead weight, it is estimated that there would be a saving of approximately 300 tons of metal. This is due to the lesser weight of the total corrugated bulkheads over the gross weight of the web type of framing.

In Figs. 14 to 19 are shown modifications of the connection by splice plates of the ends of the two aligned longitudinals, where 6 indicates the ship's skin, and 3 the transverse bulkhead. In Figs. 14 to 16 the aligned longitudinals of channel or other sections are indicated at 75 and 76 with their ends brought up to and welded to the bulkhead, the corners of said longitudinals adjacent the skin being cut off to provide the drainage or ventilation openings 77. The bulkhead is apertured to snugly receive therethrough the splice plate 78 secured surface to surface with the longitudinals and welded where it passes continuous through the bulkhead. The splice plate is generally triangular in shape with the long side 79 thereof in substantial alignment with but slightly spaced from (for welding) the free edge such as 80 of the longitudinals, the width of said plate being such as to extend substantially to the openings 77.

The construction shown in Figs. 17 to 19 is somewhat similar except that the longitudinals 85 and 86 have their ends terminating short of the bulkhead 3, have their outer corners cut off as indicated at 87, and the splice plate 88 is of lozenge or diamond shape with one diagonal of the plate lying substantially in the plane of the free edges 89 of the aligned longitudinals, and having its other diagonal in the plane of the bulkhead. In other words, the plate 78 shown in Fig. 14 is substantially in shape and size one-half of the plate 88 which latter passes continuous with a snug fit through the bulkhead 3 and is welded thereto, and is attached in surface to surface contact with the longitudinals 85 and 86 adjacent the cut corners 87 but overlapped with respect thereto. By terminating these longitudinals short of the bulkhead, the openings such as 90 are provided.

These splice plates constitute a marked improvement over the back bar construction disclosed in U. S. Letters Patent No. 1,984,271 granted December 11, 1934, to Joseph W. Isherwood and entitled Ship construction, which back bar is attached to both the longitudinal and the skin of the vessel. Substantially the same effect of such patented construction can be obtained according to the present invention without loss of strength by placing the splice plate in spaced relation to the skin. Said splice plate, which has a mid-width substantially the same as the depth of the longitudinals, can be disposed superimposed flat-wise upon and confined within the limits of the edges of the longitudinals as shown in Fig. 14, or it can be attached edge-wise to the inner edge of the longitudinals so as to be disposed outside the limits thereof as shown in Figs. 2, 7, 9 and 13, or it can be applied so as to lie superimposed flat-wise upon the longitudinals but having portions lying both within and outside of the limits of the longitudinals as shown in Fig. 17. In any event, the splice plate is passed bodily or continuously through an aperture provided therefor in the bulkhead but welded thereto all around such aperture in the region of the intersection, said bulkhead extending uncut from the splice plate aperture (38 in Fig. 6) to the skin, and said splice plate is welded or otherwise rigidly secured to the longitudinals. This results in a construction which gives adequate strength to the vessel against hogging and/or sagging, and which is undiminished over the back bar construction shown in said patent.

It is obvious that those skilled in the art may vary the details of construction and arrangements of parts without departing from the spirit of this invention and therefore it is desired not to be limited to the exact foregoing disclosure except as may be demanded by the claims.

I claim:

1. Ship tank structure comprising ship's plating and bulkheads, said bulkheads intersecting each other substantially at right angles, said bulkheads including and secured to a beam of the order of an I beam, said beam having flat imperforate surfaces and disposed within the bulkhead intersection, each bulkhead having horizontal corrugations extending to opposite edges thereof, the end edges of each bulkhead abuttingly secured in liquid-tight relation directly to the surfaces of said plating and said beam, said securement being free of angles and pieces filling the corrugations, the corrugations constituting the sole strengthening means at the securement of a bulkhead to said beam.

2. Ship tank structure comprising ship's plating and bulkheads, said bulkheads intersecting each other substantially at right angles, said bulkheads including and secured to a beam of the order of an I beam, said beam having flat imperforate surfaces and disposed within the bulkhead intersection, each bulkhead having horizontal corrugations extending to opposite edges thereof, the end edges of each bulkhead abuttingly secured in liquid-tight relation directly to the surfaces of said plating and said beam, the surfaces of said beam being of a width at least equal to the depth of the corrugations of said bulkheads to completely seal the corrugations at such edge, the corrugations constituting the sole strengthening means at the securement of a bulkhead to said beam.

3. Ship tank structure comprising ship's plating and bulkheads, said bulkheads intersecting each other substantially at right angles, said bulkheads including and secured to a beam of the order of an I beam, said beam having flat imperforate surfaces and disposed within the bulkhead intersection, at least one of said bulkheads having horizontal corrugations extending to opposite edges thereof, the end edges of each bulkhead abuttingly secured in liquid-tight relation directly to the surfaces of said plating and said beam, the securement of the corrugated bulkhead to said beam being free of angles and pieces filling the corrugations, the corrugations constituting the sole strengthening means at the securement of the corrugated bulkhead to said beam.

4. Ship construction comprising deck, bottom and side plating, longitudinal and transverse corrugated walls disposed in intersecting planes with the corrugations extending to the opposite vertical edges of such walls, and a beam of the order of an I beam disposed within the intersection of such planes, said beam extending between and secured to the deck and bottom plating, said beam having flat surfaces, the contiguous edges only of said walls contacting and abuttingly secured to such beam surfaces, and the edge of the transverse wall contiguous to the side plating abuttingly secured to the surface of said side plating, the corrugations constituting the sole strengthening means at the securement of a wall to said beam.

5. Ship construction comprising deck, bottom and side plating, longitudinal and transverse corrugated walls disposed in intersecting planes with the corrugations extending to the opposite vertical edges of such walls, and a plurality of beams each of the order of an I beam and disposed in a transverse plane of the ship, at least one of said beams disposed within the intersection of such planes, the other of said beams disposed in the plane of a transverse wall only, each of said beams extending between and secured to the deck and bottom plating, each beam having flat surfaces, the contiguous edges only of each of said walls contacting and abuttingly secured to such beam surfaces, and the edges of the transverse walls contiguous to the side plating abuttingly secured to the surface of said side plating, the corrugations constituting the sole strengthening means at the securement of a wall to a beam.

6. Ship construction comprising deck, bottom and side plating, longitudinal framing members secured to said plating, longitudinal and transverse corrugated walls disposed in intersecting planes with the corrugations extending to the opposite vertical edges of such walls, and a beam of the order of an I beam disposed within the intersection of such planes, said beam extending between and secured to the deck and bottom plating, said beam having flat surfaces, the contiguous edges only of said walls contacting and abuttingly secured to such beam surfaces, and the edges of the transverse walls contiguous to the side plating abuttingly secured to the surface of said side plating, the longitudinal framing members disposed on opposite sides of the transverse wall and aligned with each other, the ends of two aligned members interconnected by a plate passing continuous through and secured to the transverse wall, the corrugations constituting the sole strengthening means at the securement of a wall to said beam, and the corrugations, said members and said plate constituting the sole strengthening means for the transverse wall in the region of the securement of said wall to said plating.

7. Ship construction comprising deck, bottom and side plating, longitudinal framing members secured to said plating, longitudinal and transverse bulkhead walls disposed in intersecting planes, and a beam of the order of an I beam disposed within the intersection of such planes, said beam extending between and secured to the deck and bottom plating, said beam having flat surfaces, the contiguous edges only of said walls contacting and abuttingly secured to such beam surfaces, and the edges only of the transverse walls contiguous to the side plating abuttingly secured directly to the surface of said side plating, the longitudinal framing members disposed on opposite sides of the transverse wall and aligned with each other, the ends of two aligned members interconnected by a plate passing continuous through, and secured to the transverse wall, the flanges and the web of a beam constituting the strengthening means for a wall at its securement to a beam, and said plating, said members and said plate constituting the strengthening means for the transverse wall in the region of the securement of said wall to said plating.

8. In ship structure, intersecting transverse and longitudinal bulkheads comprising horizontally corrugated walls, some of the walls consisting of substantially aligned separate sections, a pillar disposed in the bulkhead intersection and having flat imperforate surfaces, each of such surfaces of a width to provide a closure for the corrugations thereat, and an additional similar pillar disposed between two such separated wall sections the wide flat imperforate surfaces of which provide a closure for the corrugations of said sections, the corrugations constituting the sole strengthening means at the securement of such walls to the surfaces of said pillars.

9. In ship structure, a longitudinal bulkhead and a transverse bulkhead intersecting the same at an angle, and a pillar comprising a single structural member disposed at the intersection of said bulkheads, one of said bulkheads having corrugations extending horizontally to an end edge thereof, said pillar being of such transverse section as to provide two bulkhead securing surfaces disposed at an angle to each other corresponding to the angle between said bulkheads, one of such surfaces being relatively wide, imperforate and abuttingly receiving, securing and completely closing the corrugated end edge of the one bulkhead, the other of said bulkheads attached to the other of such surfaces, the corrugations constituting the sole strengthening means at the securement of the corrugated bulkhead to said pillar.

10. In ship structure, a bulkhead comprising a wall having corrugations extending to an edge thereof, and a supporting beam for said wall disposed lengthwise of the corrugated edge thereof, said beam having a flat surface of a width at least equal to the depth of the corrugations at such edge, the corrugated edge of such wall contacting and abuttingly secured to such flat surface and having the corrugations thereof completely closed by such surface, the sole contacting surface of the bulkhead with the beam consisting of the end edge of said bulkhead.

11. Ship tank structure comprising ship's plating and intersecting bulkheads, said bulkheads including and secured to a supporting beam disposed within the bulkhead intersection, at least one of said bulkheads having horizontal corrugations extending to an edge thereof, said beam having flat imperforate surfaces, the end edges only of each bulkhead abuttingly secured in liquid-tight relation directly to the surfaces of said plating and of said beam free of angles and pieces filling the corrugations, the corrugations constituting the sole strengthening means at the securement of the corrugated bulkhead to said beam.

12. Ship structure comprising transverse and longitudinal bulkheads disposed in intersecting planes, at least one of said bulkheads having horizontal corrugations extending to an end edge thereof, and a pillar beam disposed within the intersection of the bulkhead planes and supporting said bulkheads, said beam having flat imperforate surfaces, the end edges only of said bulkheads being abuttingly secured to such beam surfaces, one of said surfaces being of a width at least equal to the depth of the corrugations of the corrugated bulkhead to completely close the corrugated edge thereof, the such corrugations constituting the sole strengthening means at the securement of the corrugated bulkhead to said beam.

13. In ship structure, a bulkhead comprising a pair of separate sections, each section having corrugations extending horizontally thereof throughout its width, and a vertical pillar beam disposed between and supporting said sections, said beam having relatively wide flat imperforate surfaces abuttingly receiving, closing and securing the corrugated edges of said sections, the corrugations constituting the sole strengthening means at the securement of said sections to said beam.

14. Ship structure comprising transverse and longitudinal bulkheads disposed in intersecting planes, at least one of said bulkheads having horizontal corrugations extending to an end edge thereof, said corrugations being of progressively varying depth from greatest to least in the upward extent of the bulkhead, and a pillar beam disposed within the intersection of the bulkhead planes and supporting said bulkheads, said beam having flat imperforate surfaces, the end edges only of said bulkheads being abuttingly secured to such beam surfaces, one of said surfaces being of a width at least equal to the depth of the corrugations of the corrugated bulkhead to completely close the corrugated edge thereof, the such corrugations constituting the sole strengthening means at the securement of the corrugated bulkhead to said beam.

JOHN W. STEWART.